US008904051B2

(12) United States Patent
Lee et al.

(10) Patent No.: US 8,904,051 B2
(45) Date of Patent: Dec. 2, 2014

(54) CONTROLLING MULTIPLE EXTERNAL DEVICE COUPLED TO USER EQUIPMENT

(71) Applicant: KT Corporation, Gyeonggi-do (KR)

(72) Inventors: Jung-Wook Lee, Gyeonggi-do (KR); You-Jin Kang, Seoul (KR); Sang-Ho Koh, Gyeonggi-do (KR); Jung-Suk Park, Seoul (KR); Jae-Uk Cha, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 0 days.

(21) Appl. No.: 13/726,811

(22) Filed: Dec. 26, 2012

(65) Prior Publication Data

US 2013/0166785 A1 Jun. 27, 2013

(30) Foreign Application Priority Data

Dec. 26, 2011 (KR) .................. 10-2011-0142017

(51) Int. Cl.
| | | |
|---|---|---|
| G06F 3/00 | (2006.01) | |
| G06F 13/12 | (2006.01) | |
| G06F 9/50 | (2006.01) | |
| G06F 9/445 | (2006.01) | |
| H04L 29/08 | (2006.01) | |
| G06F 9/44 | (2006.01) | |

(52) U.S. Cl.
CPC .............. G06F 9/4411 (2013.01); G06F 9/50 (2013.01); G06F 9/44505 (2013.01); H04L 67/025 (2013.01); H04L 67/125 (2013.01)
USPC .......... 710/11; 710/8; 710/14; 710/38; 710/62

(58) Field of Classification Search
None
See application file for complete search history.

(56) References Cited

U.S. PATENT DOCUMENTS

| | | |
|---|---|---|
| 5,832,471 A | 11/1998 | Fukui |
| 5,875,312 A | 2/1999 | Walsh et al. |
| 6,286,066 B1 | 9/2001 | Hayes et al. |
| 6,401,157 B1 | 6/2002 | Nguyen et al. |
| 6,516,367 B1 | 2/2003 | Barenys et al. |
| 6,535,947 B1 | 3/2003 | Amoni et al. |

(Continued)

FOREIGN PATENT DOCUMENTS

| | | |
|---|---|---|
| JP | 2003-316563 A | 11/2003 |
| JP | 2005-284657 A | 10/2005 |

(Continued)

OTHER PUBLICATIONS

Daniel Lawson NPL Oct. 2011—How to turn off notification; src: http://apple.stackexchange.com/questions/28883/how-can-i-turn-off-push-notifications-for-individual-apps-in-ios-5; obtained date: Aug. 26, 2014.

Primary Examiner — Farley Abad
Assistant Examiner — David Martinez
(74) Attorney, Agent, or Firm — IP Legal Services, LLC

(57) ABSTRACT

Described embodiments provide a method and user equipment for controlling a plurality of coupled external devices. The method may include determining whether one of applications installed in user equipment is activated upon receipt of a user input when the user equipment is coupled to a plurality of external devices, selecting one of the coupled external devices as a target external device to be mapped, when the application is determined as being activated, and mapping the selected coupled external device with the activated application and establishing a signal route between the user equipment and the selected coupled external device in association with the activated application.

15 Claims, 8 Drawing Sheets

(56) References Cited

U.S. PATENT DOCUMENTS

| | | |
|---|---|---|
| 6,600,840 B1 | 7/2003 | McCrossin et al. |
| 6,697,892 B1 | 2/2004 | Laity et al. |
| 6,804,740 B1 | 10/2004 | Watts, Jr. |
| 6,862,724 B1 | 3/2005 | Riley et al. |
| 6,915,368 B2 | 7/2005 | Lin |
| 6,934,788 B2 | 8/2005 | Laity et al. |
| 7,076,536 B2 | 7/2006 | Chiloyan et al. |
| 7,117,388 B2 | 10/2006 | Arimilli et al. |
| 7,165,109 B2 | 1/2007 | Chiloyan et al. |
| 7,196,676 B2 | 3/2007 | Nakamura et al. |
| 7,228,366 B2 | 6/2007 | Abramson et al. |
| 7,312,764 B2 | 12/2007 | Driver et al. |
| 7,386,868 B2 | 6/2008 | McCormack |
| 7,533,408 B1 | 5/2009 | Arnouse |
| 7,685,322 B2 | 3/2010 | Bhesania et al. |
| 7,853,944 B2 | 12/2010 | Choe |
| 7,884,836 B2 | 2/2011 | Hussain |
| 8,214,545 B2 | 7/2012 | Khan et al. |
| 8,250,277 B2 | 8/2012 | Tseng et al. |
| 2002/0083228 A1 | 6/2002 | Chiloyan et al. |
| 2004/0160193 A1 | 8/2004 | Cha et al. |
| 2004/0210321 A1 | 10/2004 | Hayashi et al. |
| 2004/0218036 A1 | 11/2004 | Boss et al. |
| 2004/0266425 A1 | 12/2004 | Gonsalves et al. |
| 2005/0068252 A1 | 3/2005 | Driver et al. |
| 2005/0257052 A1* | 11/2005 | Asai et al. ............ 713/166 |
| 2006/0036788 A1 | 2/2006 | Galang et al. |
| 2006/0132473 A1 | 6/2006 | Fuller et al. |
| 2006/0190652 A1 | 8/2006 | Keely et al. |
| 2007/0077965 A1 | 4/2007 | Fox |
| 2007/0171239 A1 | 7/2007 | Hunt et al. |
| 2008/0152305 A1 | 6/2008 | Ziegler |
| 2009/0049554 A1 | 2/2009 | Vuong et al. |
| 2009/0163139 A1 | 6/2009 | Wright-Riley |
| 2009/0178097 A1 | 7/2009 | Kim et al. |
| 2009/0231485 A1 | 9/2009 | Steinke |
| 2010/0064228 A1 | 3/2010 | Tsern |
| 2010/0251243 A1 | 9/2010 | Gill et al. |
| 2010/0265652 A1 | 10/2010 | Agata et al. |
| 2010/0318709 A1 | 12/2010 | Bell et al. |
| 2011/0037711 A1 | 2/2011 | Siddiqui et al. |
| 2011/0102554 A1 | 5/2011 | Saito et al. |
| 2011/0134047 A1 | 6/2011 | Wigdor et al. |
| 2011/0138327 A1* | 6/2011 | Scott et al. ............ 715/810 |
| 2011/0275391 A1* | 11/2011 | Lee et al. ............ 455/500 |
| 2011/0285916 A1 | 11/2011 | Takiduka |
| 2011/0296308 A1 | 12/2011 | Yi |
| 2012/0050183 A1 | 3/2012 | Lee |
| 2012/0050331 A1 | 3/2012 | Kanda |
| 2012/0062479 A1 | 3/2012 | Feldstein et al. |
| 2012/0088548 A1 | 4/2012 | Yun et al. |
| 2012/0117167 A1 | 5/2012 | Sadja et al. |
| 2012/0155325 A1 | 6/2012 | Eichen et al. |
| 2012/0155454 A1 | 6/2012 | Eichen et al. |
| 2012/0172088 A1 | 7/2012 | Kirch et al. |
| 2012/0297207 A1 | 11/2012 | Carlsen et al. |
| 2013/0033414 A1* | 2/2013 | Zheng et al. ............ 345/1.1 |
| 2013/0089202 A1 | 4/2013 | Altmann |
| 2013/0104149 A1 | 4/2013 | Ahn et al. |

FOREIGN PATENT DOCUMENTS

| | | |
|---|---|---|
| JP | 2006-094367 A | 4/2006 |
| JP | 2008-158342 A | 7/2008 |
| KR | 10-2004-0074759 A | 8/2004 |
| KR | 10-0487618 B1 | 5/2005 |
| KR | 10-2005-0096578 A | 10/2005 |
| KR | 10-2006-0018083 A | 2/2006 |
| KR | 10-2008-0027813 A | 3/2008 |
| KR | 10-2009-0092337 A | 8/2009 |
| KR | 10-2010-0039592 A | 4/2010 |
| KR | 10-2010-0128630 A | 12/2010 |
| KR | 10-2011-0030963 A | 3/2011 |
| KR | 10-1017866 B1 | 3/2011 |
| KR | 10-2011-0057930 A | 6/2011 |
| KR | 10-2011-0111857 A | 10/2011 |
| KR | 10-2011-0115489 A | 10/2011 |
| KR | 10-2011-0123348 A | 11/2011 |
| KR | 10-2011-0131439 A | 12/2011 |
| KR | 10-2011-0134495 A | 12/2011 |

* cited by examiner

CONTROLLING MULTIPLE EXTERNAL DEVICE COUPLED TO USER EQUIPMENT

CROSS REFERENCE TO PRIOR APPLICATIONS

The present application claims priority under 35 U.S.C. §119 to Korean Patent Application No. 10-2011-0142017 (filed on Dec. 26, 2011), which is hereby incorporated by reference in its entirety.

The subject matter of this application is related to U.S. patent application Ser. No. 13/540,112 filed Jul. 2, 2012, U.S. patent application Ser. No. 13/539,929 filed Jul. 2, 2012, U.S. patent application Ser. No. 13/460,091 filed Apr. 30, 2012, U.S. patent application Ser. No. 13/598,741 filed Aug. 30, 2012, U.S. patent application Ser. No. 13/904,286 filed May 29, 2013, U.S. patent application Ser. No. 13/726,361 filed Dec. 24, 2012, U.S. patent application Ser. No. 13/726,830 filed Dec. 26, 2012, U.S. patent application Ser. No. 13/726,384 filed Dec. 24, 2012, and U.S. patent application Ser. No. 13/726,404 filed Dec. 24, 2012, and U.S. patent application Ser. No. 13/726,422 filed Dec. 24, 2012, the teachings of which are incorporated herein their entirety by reference.

FIELD OF THE INVENTION

The present invention relates to user equipment and, in particular, to controlling multiple external devices coupled to user equipment.

BACKGROUND OF THE INVENTION

User equipment has advanced so as to perform multiple functions such as communicating voice and data with others; exchanging text messages or multimedia messages; sending e-mails; capturing a still or moving image; playing back a music or a video file, playing a game, and a receiving a broadcast signal. Lately, such multi-functional user equipment has received greater attention for new applications. Instead of using multiple independent devices, a user prefers to use single multifunction-enabled user equipment. Portability and/or mobility should be considered in design of user equipment, but such user equipment has limitations in size. Accordingly, there also are limitations in display screen size, screen resolution, and speaker performance.

In order to overcome such limitations, an external device having a large display size, better speaker performance, and connectable to a mobile terminal has been introduced. Such external device connected to the mobile terminal can provide data, music files, and other content stored in the mobile terminal in better performance.

Lately, user equipment having a high processing power central processing unit and multiple interface units. Such user equipment may be capable of being coupled to multiple external devices simultaneously and perform a plurality of applications in parallel. Accordingly, there is demand for various methods for dynamically and separately controlling multiple external devices each associated with different applications installed in the user equipment.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, user equipment may be connected to a plurality of external devices and separately control each external device in response to user input received through each corresponding external device.

In accordance with another aspect of the present invention, user equipment may include a plurality of interfaces connectable to a plurality of different types of external devices.

In accordance with still another aspect of the present invention, user equipment may simultaneously perform a plurality of applications each associated with respective external devices connected to the user equipment in response to user inputs received through the respective external devices.

In accordance with at least one embodiment of the present invention, a method may be provided for controlling a plurality of external devices coupled to user equipment. The method may include determining whether one of applications installed in user equipment is activated upon receipt of a user input when the user equipment is coupled to a plurality of external devices, selecting one of the coupled external devices as a target external device to be mapped, when the application is determined as being activated, mapping the selected coupled external device with the activated application and establishing a signal route between the user equipment and the selected coupled external device in association with the activated application.

The selecting may include selecting, as candidate external devices, at least one of the coupled external devices based on information on execution environment of the activated application and information on the coupled external devices, and selecting, as a target external device, one of the candidate external devices in response to a user input.

The execution environment information may be information on requirements for executing the activated application. The execution environment information may include information on a required input unit type, a required output unit type, a required displaying setting including a required resolution and a required display size, a required data transmit rate, a required interface type, and a required communication protocol. The external device information may include information on at least one of an identification number, a device type, an equipped input unit type, an equipped output unit type, an equipped interface unit, a maximum supported resolution, a recommended resolution, a supported horizontal frequency range, a supported vertical frequency range, a supported data transmit rate range, and supported communication protocols. In this case, the selecting may include comparing the execution environment information and the device information and selecting one having properties required by the activated application from the coupled external device based on the comparison result as the candidate external devices.

The selecting may include providing a graphic user interface for selecting one of the candidate external devices to a user and receiving a selection user input for selecting, as the target external device, one of the candidate external devices through the provided graphic user interface. The mapping may include mapping an interface unit coupled to the selected target external device to the activated application.

The method may further include performing operations associated with the activated application, transferring operation results to the selected target external device through the established signal route, and receiving a user control input from the selected target external device through the established signal route and performing operations based on the received user control input.

The selecting may include obtaining information on execution environment of the activated application and selecting, as the target external device to be mapped, one of the coupled external devices based on the obtained execution environment information of the activated application.

The selecting may include comparing the execution environment information and the device information and selecting, as the target external device, one having most properties required by the activated application from the coupled external device based on the comparison result as the candidate external devices.

The selecting may include selecting the target external device based on priorities of the coupled external devices. The priorities may be previously assigned to external devices connectable to the user equipment and information on the priorities may be stored in a memory of the user equipment.

The method may further include obtaining device information of external devices when the external devices are coupled to user equipment and assigning the priorities to the coupled external devices based on the obtained device information and information on execution environment of the activated application.

The assigning may include giving a certain weight value to properties of an external device, adding certain weight value of properties required for executing the activated application, and assigning the priorities based on total values of the coupled external devices. The assigning may include updating the priorities of the coupled external devices when another external device is coupled to the user equipment.

In accordance with at least one embodiment of the present invention, a method may be provided for controlling a plurality of external devices coupled to user equipment. The method may include obtaining an application stored in an external device when the external devices are coupled to user equipment, executing the obtained application in the user equipment, and mapping the coupled external device with the executed application and establishing a signal route between the user equipment and the coupled external device in association with the executed application.

In accordance with at least one embodiment of the present invention, a method may provided for controlling a plurality of external devices coupled to user equipment. The method may include obtaining device information of an external device when the external device is coupled to the user equipment, selecting one of applications installed in the user equipment based on a device type included in the obtained device information, executing the selected application, and mapping the coupled external device with the executed application and establishing a signal route between the user equipment and the coupled external device in association with the executed application.

In accordance with at least one embodiment of the present invention, user equipment may control a plurality of external devices coupled thereto. The user equipment may include a plurality of interface units, an application driving unit, and a control unit. The plurality of interface units may be configured to connect an external device and the user equipment and to provide a signal path for exchanging data between the user equipment and the connected external device. The application driving unit may be configured to load at least one activated application and to drive the at least one activated application. The control unit may be configured to determine whether one of applications installed in user equipment is activated upon receipt of a user input when the user equipment is coupled to a plurality of external devices through the plurality of interface units, to select one of the coupled external devices as a target external device to be mapped, when the application is determined as being activated, to map an interface unit coupled to the selected coupled external device with the activated application and to establish a signal route between the user equipment and the selected coupled external device in association with the activated application.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
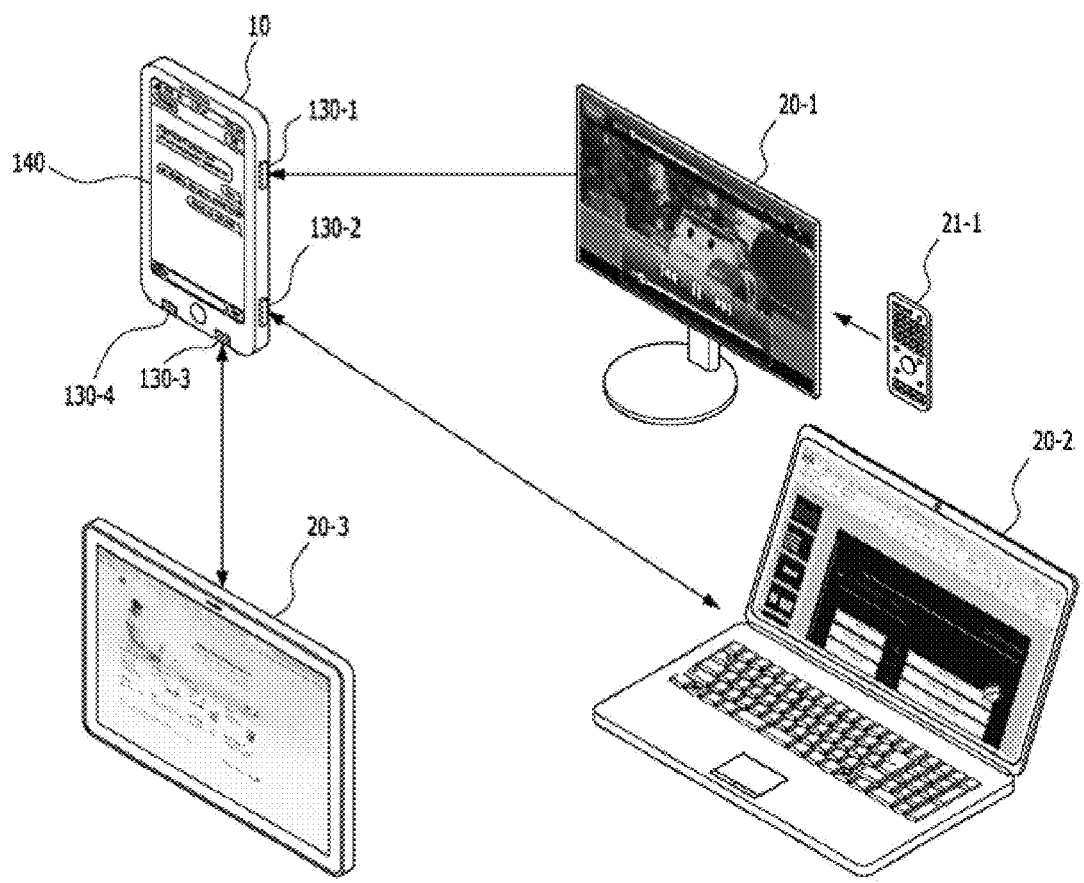
FIG. 1 shows user equipment coupled to a plurality of different types of external devices in accordance with at least one embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment of the present invention, user equipment may be connected to a plurality of external devices and separately control each external device in response to user input received through each corresponding external device. For example, user equipment may include a plurality of interfaces connectable to a plurality of different types of external devices. Through such interfaces, the user equipment may exchange data with respective external devices and simultaneously run a plurality of applications each associated with respective coupled external devices based on the exchanged data in accordance with at least one embodiment of the present invention. Such operation will be briefly described with reference to FIG. 1.

FIG. 1 shows user equipment coupled to a plurality of different types of external devices in accordance with at least one embodiment of the present invention.

Referring to FIG. 1, user equipment 10 may include multiple interfaces. For example, user equipment 10 may include four interface units 130-1 to 130-4, but the present invention is not limited thereto. Through such interface units 130-1 to 130-4, user equipment 10 may be coupled to different types of external devices. For example, user equipment 10 is coupled to three different types of external devices 20-1, 20-2, and 20-3 as shown in FIG. 1. Particularly, user equipment 10 is coupled to first external device 20-1 (e.g., large screen monitor) through first interface unit 130-1, coupled to second external device 20-2 (e.g., laptop computer), and coupled to third external device 20-3 (e.g., tablet personal computer). As shown, user equipment 10 may be coupled to various types of external device such as a monitor, a pad type device with a touch screen, a pad type device with a screen and a key pad, a navigation device, and so forth. That is, an external device may be any electronic device capable of communication with other device and including a processing unit, a display unit, and an input/output unit.

User equipment 10 may include display unit 140. Such display unit 140 may be implemented with a liquid crystal display (LCD), a (light emitting diode) LED display, and an organic light emitting diode (OLED) display, but the present invention is not limited thereto. User equipment 10 may provide various types of graphic user interfaces through such display unit 140. Such display unit 140 may be implemented with a touch screen. That is, user equipment 10 may receive inputs from users through display unit 140.

User equipment 10 may be capable of simultaneously run a plurality of applications in accordance with at least one embodiment of the present invention. For example, user equipment 10 may be installed with an operating system that supports multitasking (i.e., parallel processing). User equipment 10 may be capable of loading a plurality of applications on a main memory and simultaneously running the loaded applications based on a time slicing scheme.

User equipment 10 may display operation results of the applications through not only on display unit 140 of user equipment 10 but also on display units of coupled external devices 20-1 to 20-3. For example, user equipment 10 may simultaneously run a messenger application, a moving image player application, a text editor application, and a web browser application. In this case, user equipment 10 may separately transfer an operation result of each application to different external device in accordance with at least one embodiment of the present invention. Particularly, user equipment 10 may map the moving image player application to first interface unit 130-1 coupled to first external device 20-1 such as a large screen monitor, a text editor application to second interface unit 130-2 coupled to second external device 20-2 such as a laptop PC, and a web browser application to third interface unit 130-3 coupled to third external device 20-3 such as a tablet PC. That is, user equipment 10 may establish a signal route through an interface unit between an application and a matched external device and transfer the operation result of the application to the matched external device through the established signal route. Furthermore, user equipment 10 may receive user inputs from the matched external device through the established signal route. As shown in FIG. 1, user equipment 10 may transfer image data produced by the moving image player application to first external device 20-1 through first interface unit 130-1, transfer image data produced by the text editor application to second external device 20-2 through second interface unit 130-2, and transfer image data produced by the web browser application to third external device 20-3 through third interface unit 130-3. The present invention, however, is not limited thereto. For example, user equipment 10 may not transfer an operation result of a certain application to an external device. That is, user equipment 10 may display image data produced by the messenger application on own display unit 140. As shown in FIG. 1, user equipment 10 may display an operation result of a messenger application without transferring the operation result to one of the coupled external devices 20-1 to 20-3.

User equipment 10 may receive user input associated each application not only through input units of user equipment 10 but also through input units of coupled external devices. User equipment 10 may perform an operation of each application in response to the received user input and continuously generate an operation result, such as image data, of each application. In this case, user equipment 10 may transfer such operation result to respective external device and control respective external device to display the operation result.

External devices 20-1 to 20-3 may receive user input through own input units, such as a keyboard or a mouse of a laptop computer or a touch screen of a pad-type device. External devices 20-1 to 20-3 may transfer the received user input to user equipment 10 through corresponding interface units. User equipment 10 may process the received user input in association with related application and transfer a processing result back to corresponding external devices 20-1 to 20-3 through corresponding interface units 130-1 to 130-3. For example, a user can edit a document using a keyboard of laptop PC 20-2 through the text editor application running in user equipment 10. When a user enters sentences by presses keys of a keyboard of laptop computer 20-2, such key inputs may be transferred to user equipment 10 through second interface unit 130-2. User equipment 10 may process the key inputs in association with the text editor application and generate image data as a result of processing the key inputs. User equipment 10 may transfer the generated image data back to a display unit of laptop computer 20-2 through second interface unit 130-2. The display unit of laptop computer 20-2 may display the generated image data which displays entering new sentences in a related document. Furthermore, an external device may receive an input from another external device. For example, the large screen monitor 20-1 may receive input signals from remote controller 21-1. A user may transmit a control signal such as stop, playback, and fast forward, to large screen monitor 20-1 using remote controller 21-1. Then, large screen monitor 20-1 may transfer the received control signal to user equipment 10 and user equipment 10 may control the moving image player application based on the received control signal. External devices are described as receiving inputs from a user and transferring to user equipment 10, but the present invention is not limited thereto. An external device may simply display an operation result of an application running in user equipment 10. Hereinafter, configuration of user equipment 10 will be described in detail with reference to FIG. 2.

Figure 2:
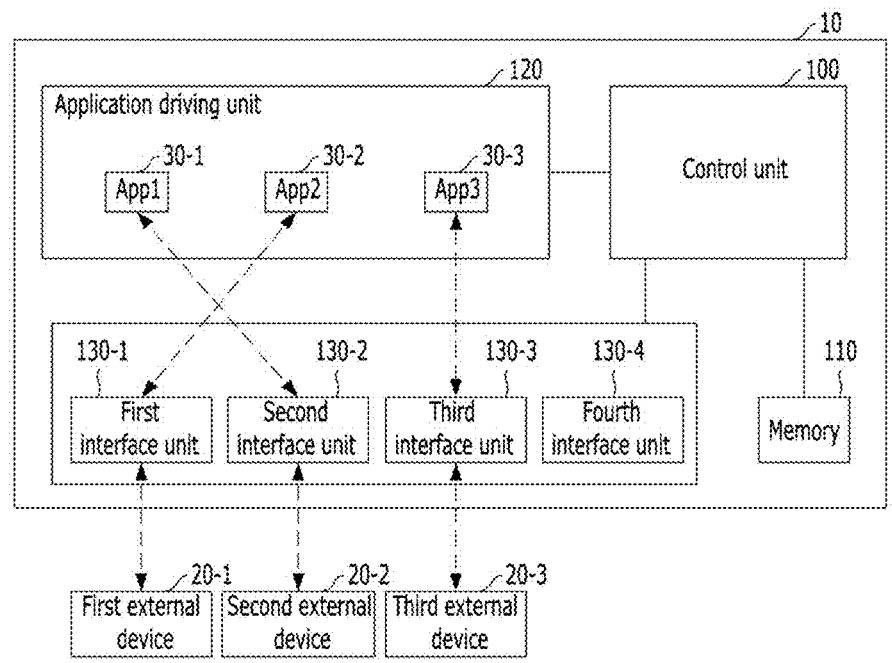
FIG. 2 is a block diagram illustrating user equipment in accordance with at least one embodiment of the present invention.

FIG. 2 is a block diagram illustrating user equipment in accordance with at least one embodiment of the present invention.

Referring to FIG. 2, user equipment 10 may include control unit 100, memory 110, application driving unit 120, a plurality of interface units 130-1 to 130-4, and display unit 140 (see FIG. 1) in accordance with at least one embodiment of the present invention.

Interface units 130-1 to 130-4 may connect user equipment 10 to various types of external devices 20-1 to 20-3. For example, one of external devices 20-1 to 20-3 may be coupled to corresponding one of interface units 130-1 to 130-4 through a wired link or a wireless link. Interface units 130-1 to 130-4 may transfer data to at least one of external devices 20-1 to 20-3 or receive data from at least one of external devices 20-1 to 20-3 through at least one of the wired link and the wireless link.

For connection through a wired link between user equipment 10 and external devices 20-1 to 20-3, interface units 130-1 to 130-4 may employ data input/output interface standards related to universal serial bus (USB), high-definition multimedia interface (HDMI), digital visual interface (DVI), IEEE1394, and/or thunderbolt in accordance with at least one embodiment of the present invention. The present invention, however, is not limited thereto. Interface units 130-1 to 130-4 may employ any interface technology the supports the transmission and reception of video data and video/audio data. For connection through a wireless link between user equipment 10 and external devices 20-1 to 20-3, interface units 130-1 to 130-4 may employ data input/output interface standards related to WiFi, Bluetooth, wireless HDMI, Intel wireless display (WIDI), and ultra wideband (UWB), but the present invention is not limited thereto. Interface unit 130-1 to 130-4 can employ any interface technology supporting the transmission and reception of video data and video/audio data through a wireless link.

Furthermore, each interface unit may include multiple different types of data input/output interface units in accordance with at least one embodiment of the present invention. For example, one interface unit may be a combination of a HDMI interface unit and a USB interface unit.

Application driving unit 120 may control overall operations associated with running multiple applications in parallel in accordance with at least one embodiment of the present invention. For example, application driving unit 120 may load applications on a main memory of user equipment 10 and drive the loaded application in accordance with at least one embodiment of the present invention. Application driving unit 120 may control a plurality of loaded applications to share resources of user equipment 10, such as a central processing unit (CPU), so as to drive the plurality of the loaded application simultaneously (e.g., parallel processing or multitasking). For such parallel processing, application driving unit 120 may control operations of multiple applications using a time scheduling scheme. Application driving unit 120 may employ a time slicing scheme as the time scheduling scheme. In this case, application driving unit 120 may divide a CPU time into segments based on a predetermined policy. Application driving unit 120 may distribute and assign CPU time segments to respective applications. Each application may use a CPU to perform a requested operation during an associated CPU time segment and others may wait for their turns. Since each CPU time segment is very short, a plurality of applications may perform related operations in parallel, specially, from a view point of a user. For example, first application 30-1, second application 30-2, and third application 30-3 may be running in parallel in respect to the time slicing scheme as shown in FIG. 2.

Memory 110 may store information on an external device, such as device information, when user equipment 10 is coupled to the external device through at least one of interface units 130-1 to 130-4 in accordance with at least one embodiment of the present invention. For example, the device information may be information on properties of an external device. The device information of the external device may include at least one of an identification number, a device type, equipped constituent elements, and properties of each equipped constituent elements. For example, the device information may include information on an equipped input unit type, an equipped output unit type, an equipped interface unit, and so forth, but the present invention is not limited thereto. Particularly, properties of each equipped constituent elements may be at least one of a maximum supported resolution, a recommended resolution, a supported horizontal frequency range, a supported vertical frequency range, a supported data transmit rate range, supported communication protocol, and so forth. Furthermore, the device information may include a priority assigned thereto. Such priority may be used for selecting one to be mapped to an activated application.

In accordance with at least one embodiment of the present invention, user equipment 10 may request such information to an external device when user equipment 10 is coupled to the external device. For example, user equipment 10 may transmit an information request message to an external device when user equipment 10 is coupled to the external device. In response to the request message, the external device may transmit a response message to user equipment 10 with the requested information. The present invention, however, is not limited thereto. Memory 110 may store information on all types of connectable external devices that user equipment 10 supports. In this case, user equipment 10 may receive identification information from a coupled external device, such as a type and an identification number of the coupled external device, and retrieve related information from memory 110 based on the received identification information.

Such stored information on the external device may be used for mapping an application to an interface unit in accordance with at least one embodiment of the present invention. Furthermore, memory 110 may store overall information of execution environment of user equipment 10, such as an operating system, a processing status, a processing result of each application, data produced by each application, and so forth. Memory 110 may further store personal data such as telephone numbers, photos, documents, and so forth.

Control unit 100 may control overall operations of user equipment 10. In accordance with at least one embodiment of the present invention, control unit 100 may separately control each external device coupled to interface units 130-1 to 130-4 in response to user input received through each corresponding external device or user equipment 10 in cooperation with application driving unit 120. For example, control unit 100 may control a plurality of interfaces 130-1 to 130-4 connected to a plurality of different types of external devices. Control unit 100 may control exchanging signals with respective external devices and simultaneously run a plurality of applications each associated with respective coupled external devices based on the exchanged data in cooperation with application driving unit 120.

Particularly, control unit 100 may map at least one of applications running in user equipment 10 with at least one of interface units 130-1 to 130-4 coupled to a corresponding external device. After mapping, control unit 100 may establish a signal route from user equipment 10 to the corresponding external device through an associated interface unit. For example, control unit 100 may map first application 30-1 with second interface unit 130-2, second application 30-2 with first interface unit 130-1, and third application 30-3 with third interface unit 130-3, as shown in FIG. 2. In order to map an application with one of interface units 130-1 to 130-4 for establishing a signal route to an associated external device, control unit 100 may refer various policies in accordance with at least one embodiment of the present invention. Such operations will be described in detail with reference to FIG. 5 to FIG. 9.

In accordance with at least one embodiment of the present invention, control unit 100 may provide a graphic user interface for enabling a user to select one of coupled external device when an application is activated or executed in response to a user input. In this case, control unit 10 may select, as candidate external devices, at least one coupled external devices based on device information of coupled external device and execution environment information of an activated application.

Figure 3:
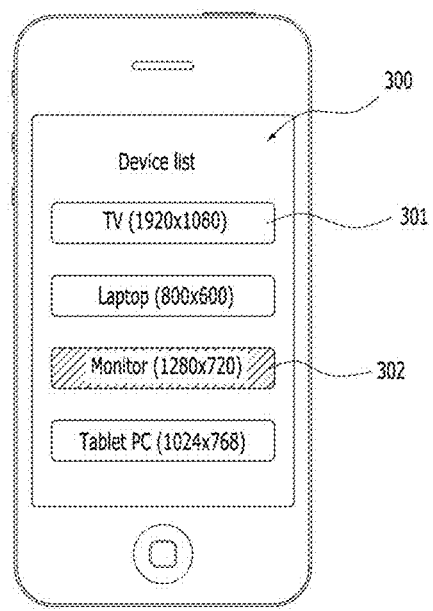
FIG. 3 shows a graphic user interface displayed for providing information on candidate external devices coupled to user equipment in accordance with at least one embodiment of the present invention.

FIG. 3 shows a graphic user interface displayed for providing information on candidate external devices coupled to user equipment in accordance with at least one embodiment of the present invention.

Referring to FIG. 3, user equipment 10 may provide the selected candidate external devices through graphic user interface 300. Such graphic user interface 300 may include sections 301 and 302 showing a device type and a resolution of each candidate external device, but the present invention is not limited thereto. According to graphic user interface 300, a user may notice that four different types of external devices: a TV, a laptop computer, a monitor, and a tablet PC, are available for activating a predetermined application. Furthermore, the user may notice that a resolution of each coupled external device: 1920×1080 for TV, 800×600 for laptop computer, and so forth, as shown in FIG. 3.

In accordance with at least one embodiment of the present invention, control unit 100 may display such graphic user interface 300 whenever an application is initiated, for example, when receiving an activation user input for activating an application. Furthermore, when application driving unit 111 loads an activated application in response to an activation user input, control unit 100 may display graphic user interface 200. The present invention, however, is not limited thereto.

Figure 4:
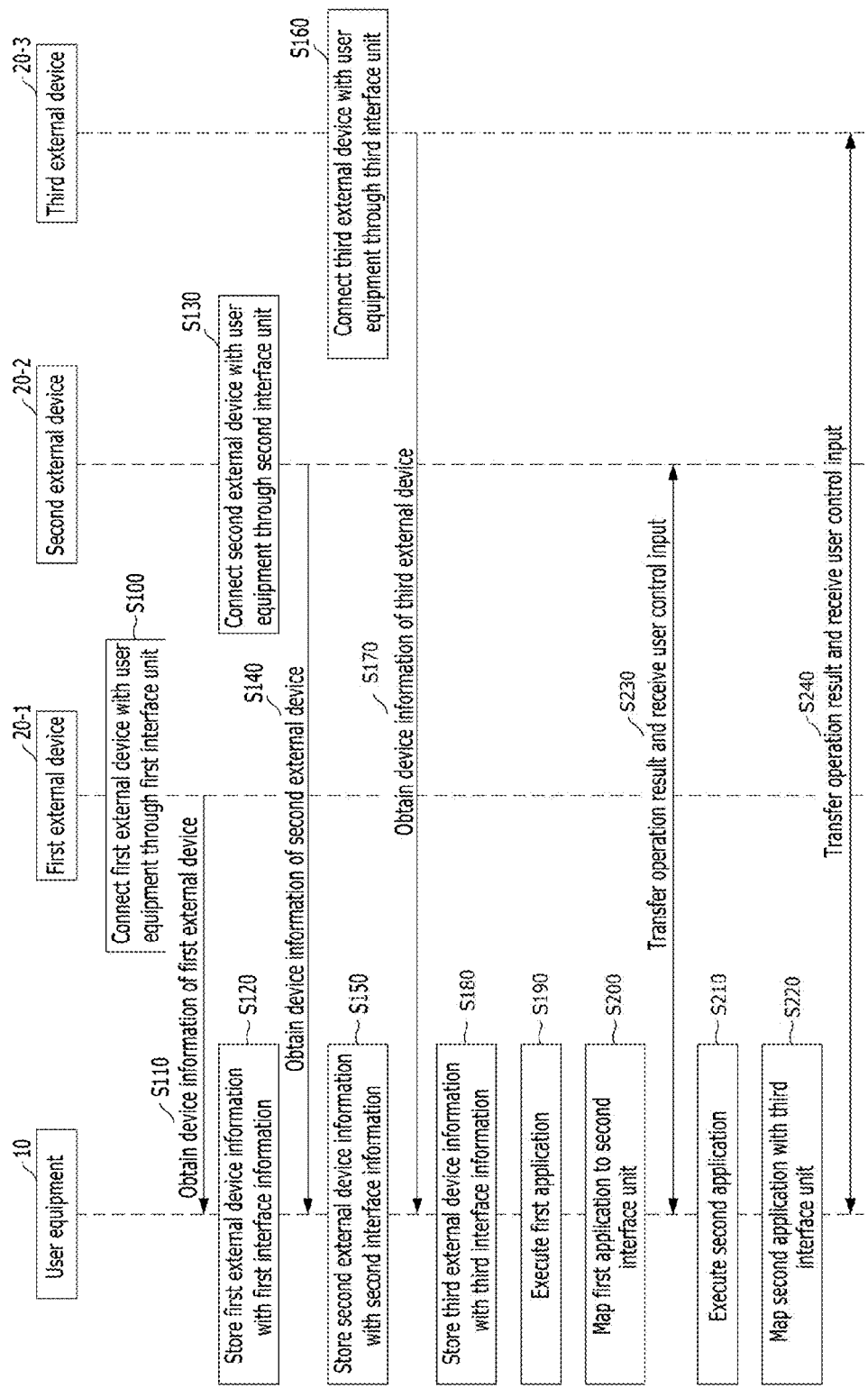
FIG. 4 shows operation of user equipment for controlling external devices coupled thereto in accordance with at least one embodiment of the present invention.
Figure 5:
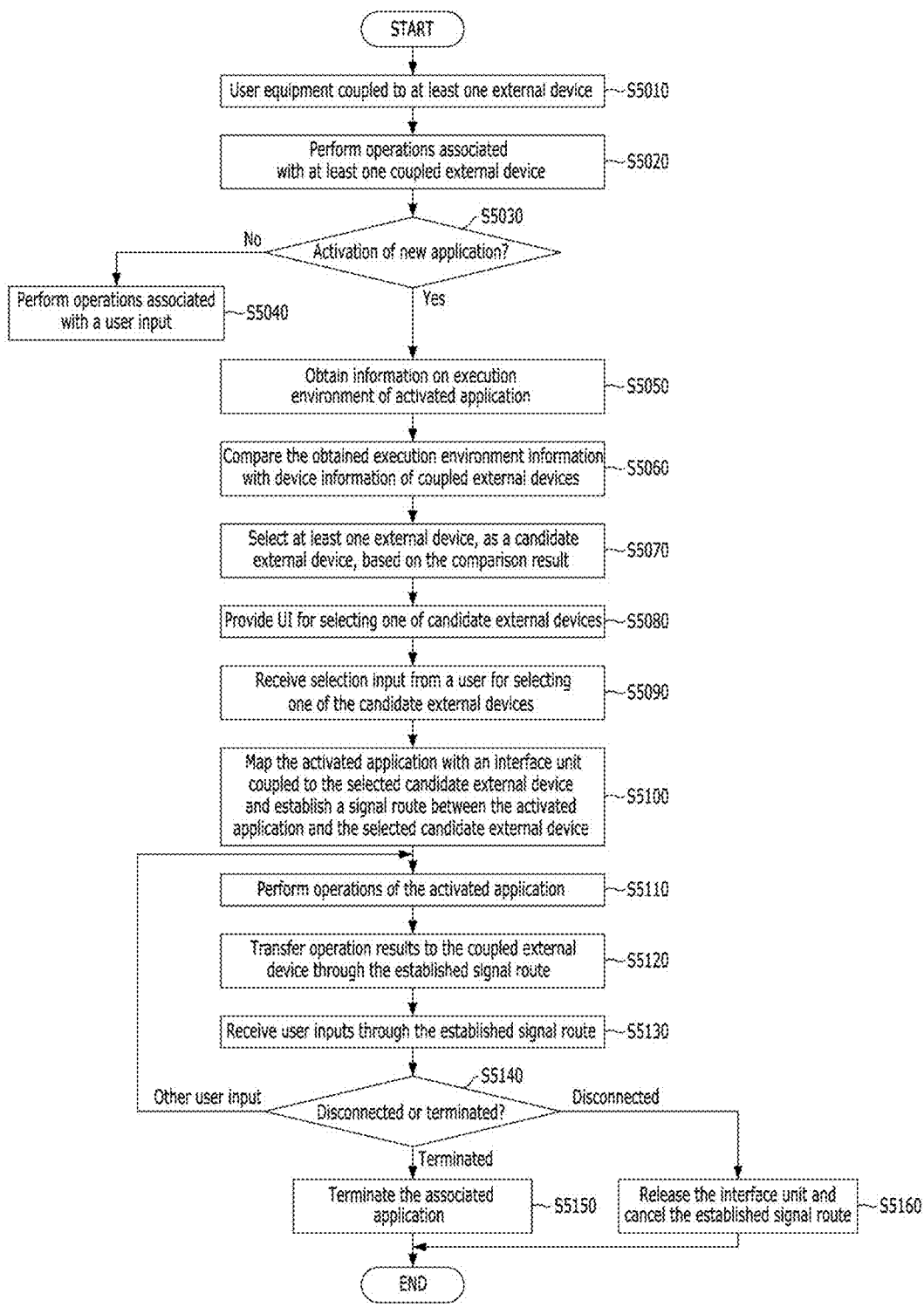
FIG. 5 shows a method for controlling a plurality of coupled external devices by mapping an activated application with an associated external device selected from candidate external devices based on a user input in accordance with at least one embodiment of the present invention.

Referring back to FIG. 2, in order to select such candidate external devices, control unit 100 may obtain information on the execution environment of an activated application and compare it with device information of coupled external devices (FIG. 5 for further description). The execution environment information may be information on requirements for running an application, for example, required input unit type, required output unit type, required display setting such as a resolution and a display size, a required data transmit rate, a required interface type, a required communication protocol, and so forth. The device information of each coupled external device may include at least one similar part of the execution environment information of the activated application. Control unit 100 may obtain such execution environment information of the activated application, compare the obtained execution environment information with the device information of each coupled external device, and select at least one of coupled external devices based on the comparison result as candidate external devices. That is, external devices satisfying the requirements for performing the activated application may be selected as the candidate external devices based on the comparison result. Furthermore, control unit 100 may select one optimally suitable for the activated application based on the execution environment information and the device information of coupled external devices. Such a selected external device may be displayed as being highlighted for a user to easily recognize. For example, when control unit 100 selects a monitor as the optimal external device among candidate external devices such as a TV, a laptop computer, a monitor, and a tablet PC, the monitor may be displayed as highlighted, as shown in FIG. 4.

A user may select one of candidate external devices using graphic user interface 300. For example, the user may select one of the candidate external devices through an input unit of user equipment 100, such as a touch screen. When the user select one of the candidate external devices in graphic user interface 300, control unit 100 may map an interface unit associated with the selected external device to the application and establish a signal route from the application to the selected external device in accordance with at least one embodiment of the present invention. The above described operation will be described in detail with reference to FIG. 5.

Figure 6:
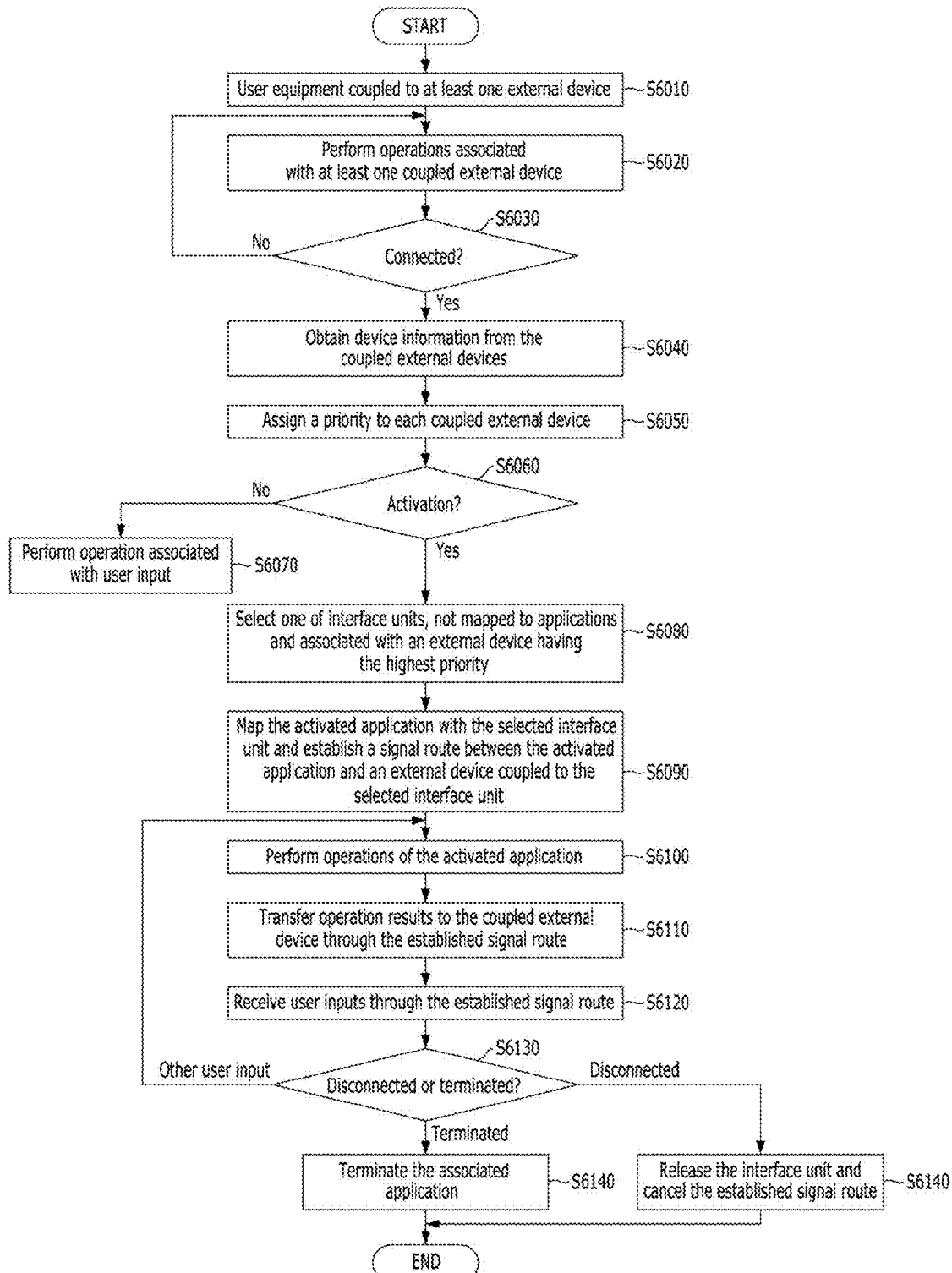
FIG. 6 shows a method for controlling a plurality of coupled external devices by mapping an activated application with an associated external device selected based priority of each coupled external device in accordance with at least one embodiment of the present invention.

In another embodiment, control unit 100 may select one of coupled external devices based on a priority of each coupled external device when an application is invoked (see FIG. 6 for further description). For example, control unit 100 may assign a priority to each coupled external device. Such priority may be updated when an external device is additionally coupled to user equipment 10. Such priority may be previously assigned to all types of external devices that user equipment 10 can support. Based on such priority, control unit 100 may select one of coupled external devices, but the present invention is not limited thereto. Furthermore, such priority may be decided by control unit 100 based on device information of coupled external devices and execution environment information of an activated application. For example, control unit 100 may analyze the device information and the execution environment information and assign priorities based on the analysis result. Particularly, control unit 100 may give a predetermined weight to respective properties of a coupled external device. Device information may also include information on such properties of each coupled external device. The properties may include information on an equipped input unit type, an equipped output unit type, an equipped interface unit, and so forth, but the present invention is not limited thereto. Particularly, properties of each equipped constituent elements may be at least one of a maximum supported resolution, a recommended resolution, a supported horizontal frequency range, a supported vertical frequency range, a supported data transmit rate range, supported communication protocol, and so forth. When a coupled external device includes properties required by an activated application, control unit 100 may add corresponding weights of the required properties. Coupled external devices may be given with a priority based on the total weight thereof. As another example, priorities may be assigned to each coupled external device by comparing each property of coupled external devices. For example, first, second, and third properties of external devices may be selected as a display size of a display unit, a maximum resolution supported by a display unit, and a data transmit rate of an interface unit. In this case, first properties of the external devices are compared and priorities may be assigned to the external devices based on the comparison result. For example, an external device has the largest display size may be assigned with the highest priority. When more than two external devices have the same display size, the second property such as the maximum resolution of the associated external devices may be compared and priorities may be given based on the comparison result. The present invention, however, is not limited thereto. Such priorities may be assigned to each coupled external device through various methods. After selecting an external device, control unit 100 may map an interface unit associated with the selected external device to the activated application and establish a signal route from the application to the selected external device in accordance with at least one embodiment of the present invention. The above described operation will be described in detail with reference to FIG. 6.

Figure 7:
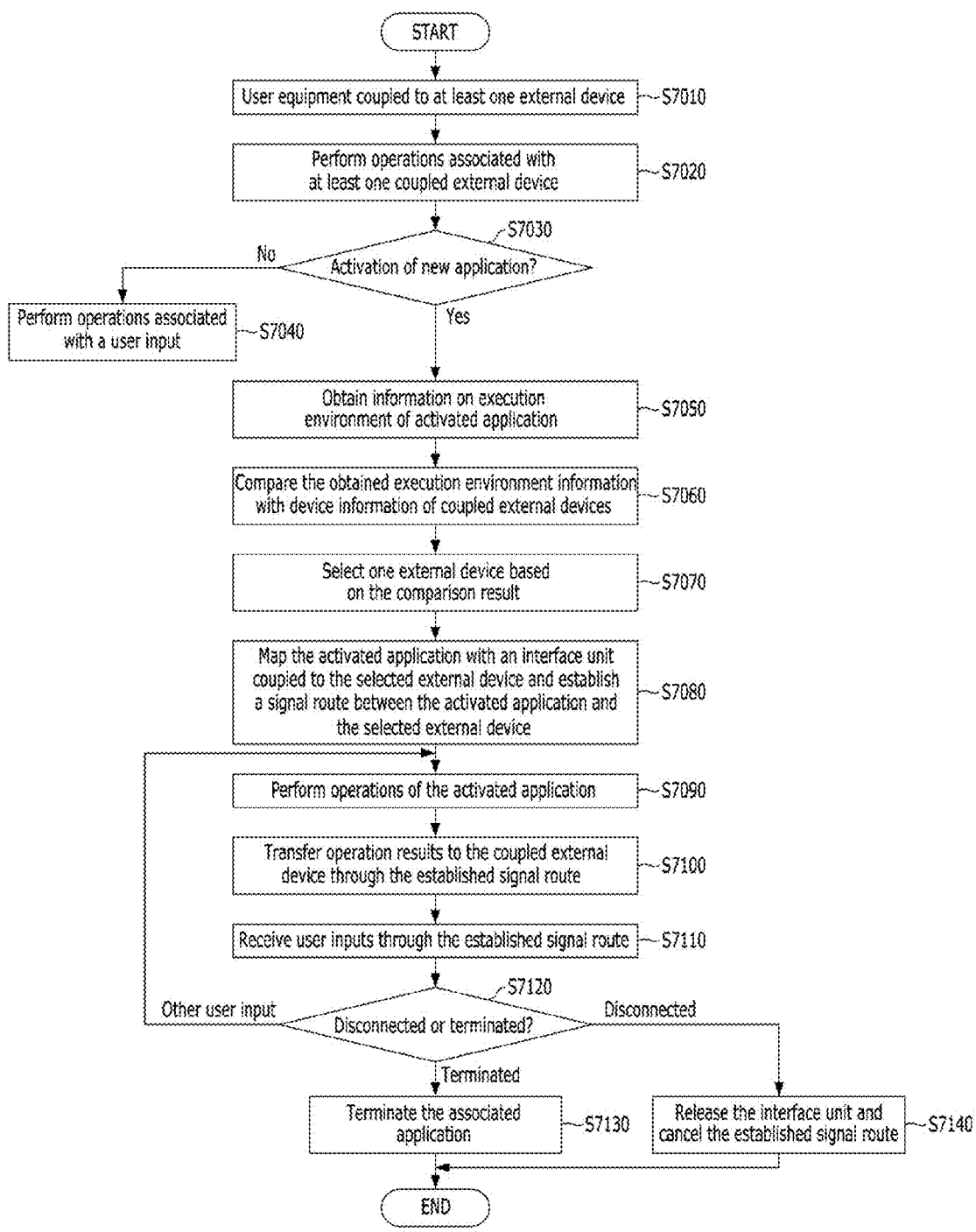
FIG. 7 shows a method for controlling a plurality of coupled external devices by mapping an activated application with an associated external device selected based on information on execution environment of an activated application. in accordance with at least one embodiment of the present invention.

In still another embodiment, control unit 100 may select one of coupled external devices based on information on execution environment of an activated application (see FIG. 7 for further description). For example, control unit 100 may obtain information an execution environment of an application when the application is invoked to run. As described, the execution environment information may be information on required properties for running an application, for example, required input device type, required output device type, and required display setting such as a resolution and a display size. Control unit 100 may compare the obtained execution environment of the activated application with the device information of the coupled external devices and select one having properties most matched with required properties for running the activated application among the coupled external devices based on the comparison result. When at least two external devices have the same number of properties matched with required properties, priorities may be assigned to each coupled external device by comparing each property of coupled external devices. Since such operation was described above, detailed description thereof is omitted. After selecting an external device based on such method, control unit 100 may map an interface unit associated with the selected external device to the activated application and establish a signal route from the application to the selected external device in accordance with at least one embodiment of the present invention. The above described operation will be described in detail with reference to FIG. 7.

Figure 8:
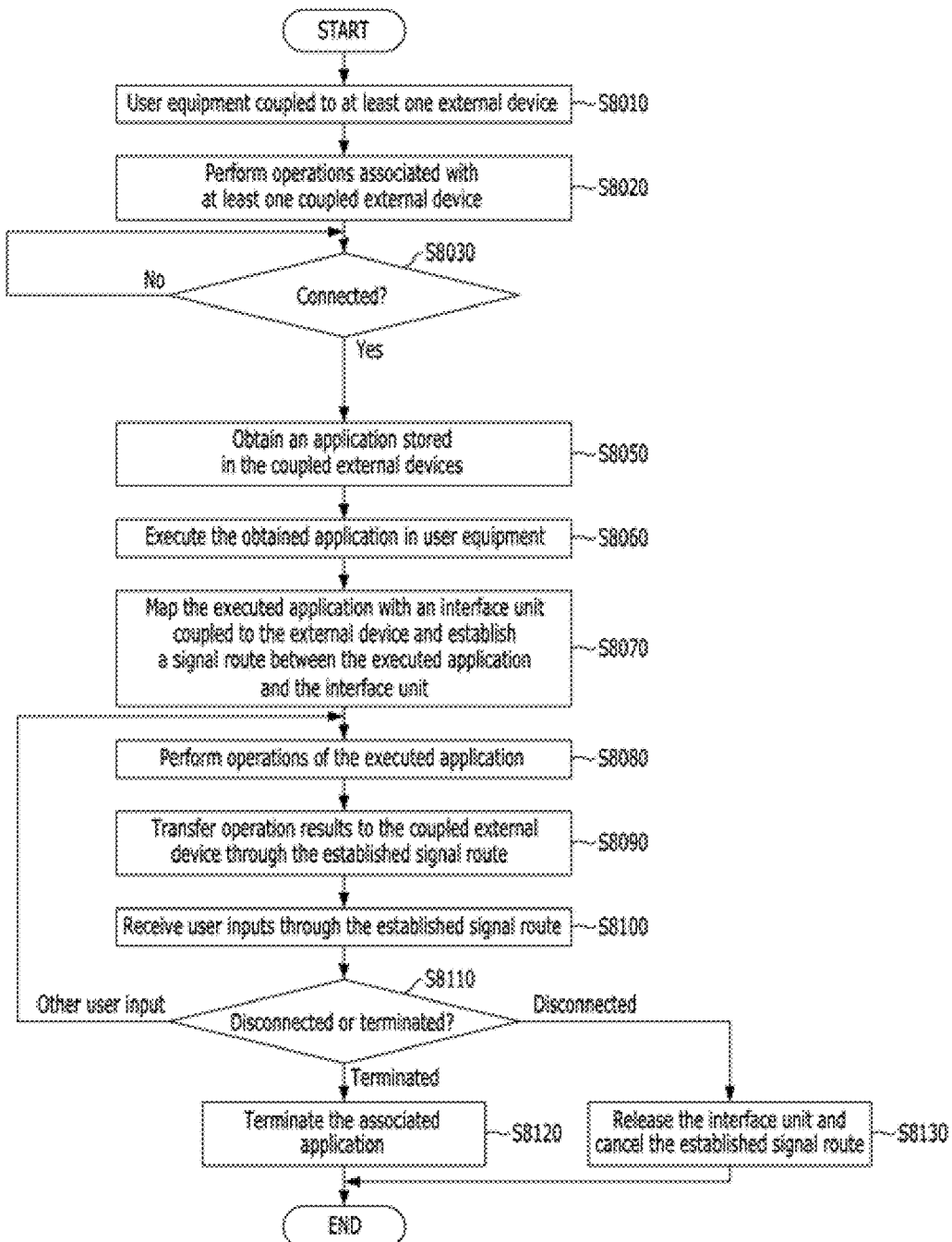
FIG. 8 shows a method for controlling a plurality of coupled external devices by obtaining an application from an external device and mapping the obtained application with a corresponding interface unit coupled to the external device in accordance with at least one embodiment of the present invention.

In yet another embodiment, control unit 100 may obtain an application from an external device when the external device is coupled to user equipment 100 and map the obtained application with a corresponding interface unit coupled to the external device (see FIG. 8 for further description). For example, control unit 100 may recognize connection to an external device when the external device is couple to user equipment 10. Upon the recognition of the connection, control unit 100 may retrieve an application associated with the external device from a memory unit of the external device. Control unit 100 may map an interface unit associated with the coupled external device to the obtained application and establish a signal route from the application to the coupled external device in accordance with at least one embodiment of the present invention. The above described operation will be described in detail with reference to FIG. 8.

Figure 9:
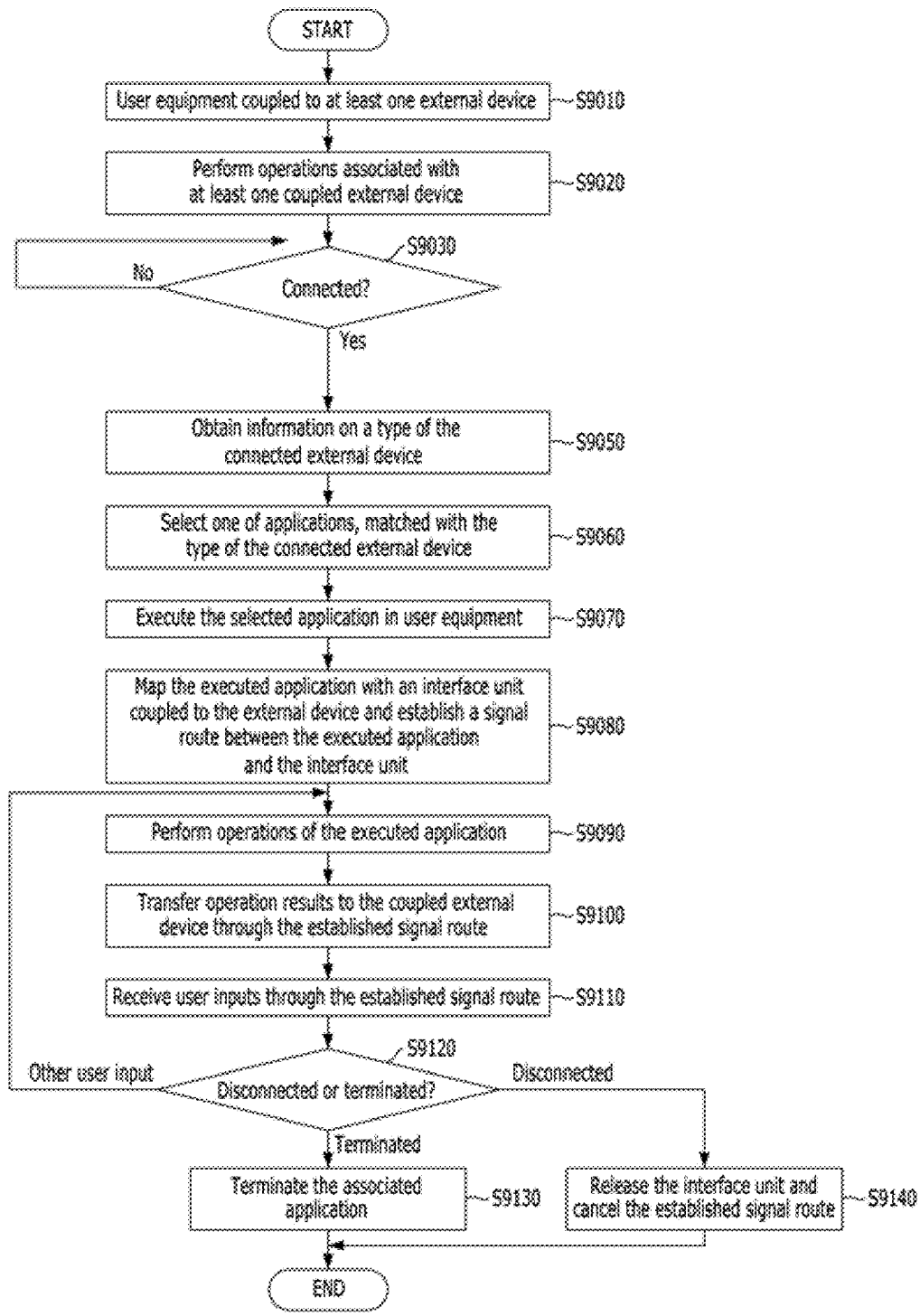
FIG. 9 shows a method for controlling a plurality of coupled external devices by selecting an application based on a device type of a coupled external device and mapping the selected application with to the coupled external device in accordance with at least one embodiment of the present invention

In still yet another embodiment, control unit 100 may obtain information on a device type of an external device when the external device is coupled to user equipment 100 and obtain an application matched with the device type (see FIG. 9 for further description). For example, control unit 100 may determine a device type of an external device based on device information thereof when the external device is coupled to user equipment 10. Based on the determined device type, control unit 100 may select an application matched with the determined device type. In this case, control unit 100 may select at least one application installed in user equipment 10 and provide a list of the selected applications to a user for selection. After selecting an application from the list, control unit 100 may map an interface unit associated with the coupled external device to the selected application and establish a signal route from the application to the coupled external device in accordance with at least one embodiment of the present invention. The above described operation will be described in detail with reference to FIG. 9.

As described above, user equipment 10 may be connected to a plurality of external devices and separately control each external device in response to user input received through each corresponding external device. Such operation will be described with reference to FIG. 4 to FIG. 9.

FIG. 4 shows operation of user equipment for controlling external devices coupled thereto in accordance with at least one embodiment of the present invention.

Referring to FIG. 4, first external device 20-1 may be coupled to user equipment 10 through first interface unit 130-1 at step S100. Upon the connection, user equipment 10 may obtain device information of first external device 20-1 at step S110. For example, user equipment 10 may receive such device information from first external device 20-1 or retrieve the device information from memory 110 of user equipment 100. User equipment 10 may store the obtained device information of first external device 20-1 with information on first interface unit 130-1 at step S120.

Second external device 20-2 may be coupled to user equipment 10 through second interface unit 130-2 at step S130. Upon the connection, user equipment 10 may obtain device information of second external device 20-2 at step S140. For example, user equipment 10 may receive such device information from second external device 20-2 or retrieve the device information from memory 110 of user equipment 100. User equipment 10 may store the obtained device information of second external device 20-2 with information on second interface unit 130-2 at step S150.

Similarly, third external device 20-3 may be coupled to user equipment 10 through third interface unit 130-3 at step S160. Upon the connection, user equipment 10 may obtain device information of third external device 20-3 at step S170. For example, user equipment 10 may receive such device information from third external device 20-3 or retrieve the device information from memory 110 of user equipment 100. User equipment 10 may store the obtained device information of third external device 20-3 with information on third interface unit 130-3 at step S180.

After three different types of external devices 20-1 to 20-3, user equipment 10 may separately control running applications each associated with respective coupled external devices 20-1 to 20-3 in accordance with at least one embodiment of the present invention. Particularly, user equipment 10 may map an activated application with one of interface units 130-1 to 130-3 based on the device information of coupled external devices 20-1 to 20-3 and execution environment information of the activated application. Such mapping may be performed through various methods in accordance with at least one embodiment of the present invention. Such operation will be briefly described hereinafter.

When a first application is activated at step S190, user equipment 10 may select second interface unit 130-2 based on the device information of external device 20-2 coupled to second interface unit 130-2 and the execution environment information of the activated first application and map selected second interface unit 130-2 with the activated first application at step S200. That is, user equipment 10 may establish a signal route from user equipment 10 to second external device 20-2 for exchanging data associated with the first application. At step S210, user equipment 10 may transfer an operation result of the activated application to second external device 20-2 through the established signal route and receive user input received in second external device 20-2 from second external device 20-2 through the established signal route. User equipment 10 may process the received user input in association with the first application.

When a second application is activated at step S220, user equipment 10 may select third interface unit 130-3 based on the device information of third external device 20-3 coupled to third interface unit 130-3 and the execution environment information of the activated second application and map selected third interface unit 130-3 with the activated second application at step S230. That is, user equipment 10 may establish a signal route from user equipment 10 to third external device 20-3 for exchanging data associated with the second application. At step S240, user equipment 10 may transfer an operation result of the activated application to third external device 20-3 through the established signal route and receive user input received in third external device 20-3 from third external device 20-3 through the established signal route. User equipment 10 may process the received user input in association with the second application.

As described, when an application installed in user equipment 10 is activated, user equipment 10 may map an activated application with one of interface units 130-1 to 130-3 through various methods in accordance with at least one embodiment of the present invention. Such operation will be described in detail with reference to FIG. 5 to FIG. 9.

FIG. 5 shows a method for controlling a plurality of coupled external devices by mapping an activated application with an associated external device selected from candidate external devices based on a user input in accordance with at least one embodiment of the present invention.

Referring to FIG. 5, user equipment 10 may be coupled to at least one external device at step S5010. At step S5020, user equipment 10 may perform operations associated with at least one coupled external device. In this case, when a user input is received, user equipment 10 may determine whether the received user input may be an activation input for activating one of applications installed in user equipment 10 as step S5030. When the received user input is not the activation input (No—S5030), user equipment 10 may perform operations associated with the received user input at step S5040.

When the received user input is the activation input (Yes—S5030), user equipment 10 may obtain information on execution environment of activated application at step S5050. At step S5060, user equipment 10 may compare the obtained execution environment information with device information of coupled external devices 20-1 to 20-3. Based on the comparison result, user equipment 10 may select at least one external device, as a candidate external device, based on the comparison result at step S5070. As described above, the execution environment information may be information on requirements for running the activated application. For example, the execution environment may include information on a required input unit type, a required output unit type, a required displaying setting including a required resolution and a required display size, a required data transmit rate, a required interface type, a required communication protocol, and so forth. The device information of each coupled external device may include information on at least one of an identification number, a device type, an equipped input unit type, an equipped output unit type, an equipped interface unit, a maximum supported resolution, a recommended resolution, a supported horizontal frequency range, a supported vertical frequency range, a supported data transmit rate range, and supported communication protocols. Control unit 100 may compare the obtained execution environment information with the device information of each coupled external device, and select at least one of coupled external devices based on the comparison result as candidate external devices. That is, external devices satisfying the requirements for performing the activated application may be selected as the candidate external devices based on the comparison result. User equipment 10 may select one having properties required by the activated application from the coupled external device based on the comparison result as the candidate external devices. Furthermore, control unit 100 may select one optimally suitable for the activated application based on the execution environment information and the device information of coupled external devices. Such a selected external device may be displayed as being highlighted for a user to easily recognize. For example, when control unit 100 selects a monitor as the optimal external device among candidate external devices such as a TV, a laptop computer, a monitor, and a tablet PC, the monitor may be displayed as highlighted, as shown in FIG. 3.

At step S5080, user equipment 10 may provide a graphic user interface for selecting one of candidate external devices. At step S5090, user equipment 10 may receive a selection input from a user for selecting one of the candidate external devices in the provided graphic user interface.

At step S5100, user equipment 10 may map the activated application with an interface unit coupled to the selected candidate external device and establish a signal route between the activated application and the selected candidate external device. That is, user equipment 10 may form a signal route for exchanging data between user equipment 10 and the selected external device in association with the activated application.

At step S5110, user equipment 10 may perform operations of the activated application. As a result of performing the operations associated with the activated application, various types of data may be created. For example, image data may be produced as a result of performing operations associated with a moving image player application. User equipment 10 may transfer such image data to the coupled external device through the established signal route and display the image data through a comparatively larger screen of the coupled external device by controlling the coupled external device.

At step S5120, user equipment 10 may transfer operation results to the coupled external device through the established signal route. For example, the coupled external device may receive such created image data through the established signal route and display the received image data on a display unit of the coupled external device in response to control of user equipment 10.

At step S5130, user equipment 10 may receive user inputs through the established signal route from the coupled external device. For example, the coupled external device may receive various types of user inputs through input units of the coupled external device. In this case, the coupled external device may transfer such received user inputs to user equipment 10 through the established signal route.

At step S5140, user equipment 10 may determine whether the received user input from the coupled external device is one of user inputs for disconnecting the coupled external device from user equipment 10, for terminating the activated application, and for controlling the associated application.

When the received user input is for termination (Terminated—S5140), user equipment 10 may terminate the activated application at step S5150. When the received user input is for disconnecting the coupled external device from user equipment 10 (Disconnected—S5140), user equipment 10 may release the interface unit coupled to the external device and cancel the established signal route at step S5160.

Furthermore, when the received user input is for controlling the activated application, user equipment 10 may perform operations associated with the received user input in association with the activated application at step S5110.

In another embodiment, control unit 100 may select one of coupled external devices based on a priority of each coupled external device when an application is invoked. Hereinafter, such operation will be described in detail with reference to FIG. 6.

FIG. 6 shows a method for controlling a plurality of coupled external devices by mapping an activated application with an associated external device selected based priority of each coupled external device in accordance with at least one embodiment of the present invention.

Referring to FIG. 6, user equipment 10 may be coupled to at least one external device at step S6010. At step S6020, user equipment 10 may perform operations associated with at least one coupled external device. In this case, when a new external device is coupled to user equipment 10 at step S6030, user equipment 10 may obtain device information from all of the coupled external devices at step S6040 and assign a priority to each coupled external device at step S6050. For example, control unit 100 may assign a priority to each coupled external device based on the obtained device information. Such priority may be previously assigned to all types of external devices that user equipment 10 can support. Furthermore, such priority may be decided by control unit 100 based on device information of currently coupled external devices. For example, control unit 100 may analyze device information of the currently coupled external devices and assign priorities based on the analysis result. Particularly, control unit 100 may give a predetermined weight to respective properties of a coupled external device. When a coupled external device includes properties required by an activated application, control unit 100 may add corresponding weights of the required properties. Coupled external devices may be given with a priority based on the total weight thereof. As another example, priorities may be assigned to each coupled external device by comparing each property of coupled external devices. Such priorities assigned to the coupled external devices may be updated whenever an external device is additionally coupled to user equipment 10.

When user equipment 10 receives a user input, user equipment 10 may determine whether the received user input is an activation input for activating an application at step S6060. When the received user input is not the activation input (No—S6060), user equipment 10 may perform operation associated with the received user input at step S6070.

When the received user input is the activation input (Yes—S6060), user equipment 10 may select one of interface units, not mapped to applications and associated with an external device having the highest priority at step S6080.

At step S6090, user equipment 10 may map the activated application with an interface unit coupled to the selected external device having the highest priority and establish a signal route between the activated application and the selected external device. At step S6100, user equipment 10 may perform operations of the activated application. At step S6110, user equipment 10 may transfer operation results to the coupled external device through the established signal route. At step S6120, user equipment 10 may receive user inputs through the established signal route from the coupled external device. For example, the coupled external device may receive various types of user inputs through input units of the coupled external device. In this case, the coupled external device may transfer such received user inputs to user equipment 10 through the established signal route.

At step S6130, user equipment 10 may determine whether the received user input from the coupled external device is one of user inputs for disconnecting the coupled external device from user equipment 10, for terminating the activated application, and for controlling the associated application. When the received user input is for termination (Terminated—S6130), user equipment 10 may terminate the activated application at step S6140. When the received user input is for disconnecting the coupled external device from user equipment 10 (Disconnected—S6130), user equipment 10 may release the interface unit coupled to the external device and cancel the established signal route at step S6150. Furthermore, when the received user input is for controlling the activated application, user equipment 10 may perform operations associated with the received user input in association with the activated application at step S6100.

In still another embodiment, user equipment 10 may select one of coupled external devices based on information on execution environment of an activated application. Hereinafter, such operation will be described in detail with reference to FIG. 7.

FIG. 7 shows a method for controlling a plurality of coupled external devices by mapping an activated application with an associated external device selected based on information on execution environment of an activated application. in accordance with at least one embodiment of the present invention.

Referring to FIG. 7, user equipment 10 may be coupled to at least one external device at step S7010. At step S7020, user equipment 10 may perform operations associated with at least one coupled external device. In this case, when a user input is received, user equipment 10 may determine whether the received user input is an activation input for activating one of applications installed in user equipment 10 as step S7030. When the received user input is not the activation input (No—S7030), user equipment 10 may perform operations associated with the received user input at step S7040.

When the received user input is the activation input (Yes—S7030), user equipment 10 may obtain information on execution environment of the activated application at step S7050 and compare the obtained execution environment information with device information of coupled external devices at step S7060. As described, the execution environment information may be information on required properties for running an application, for example, required input device type, required output device type, and required display setting such as a resolution and a display size. Control unit 100 may compare the obtained execution environment of the activated application with the device information of the coupled external devices.

At step S7070, user equipment 10 may select one external device based on the comparison result. For example, control unit 100 may select one having properties most matched with required properties for running the activated application among the coupled external devices based on the comparison result. When at least two external devices have the same number of properties matched with required properties, priorities may be assigned to each coupled external device by comparing each property of coupled external devices.

At step S7080, user equipment 10 may map the activated application with an interface unit coupled to the selected external device most matched with required properties of the activated application and establish a signal route between the activated application and the selected external device. At step S7090, user equipment 10 may perform operations of the activated application. At step S7100, user equipment 10 may transfer operation results to the coupled external device through the established signal route. At step S7110, user equipment 10 may receive user inputs through the established signal route from the coupled external device. For example, the coupled external device may receive various types of user inputs through input units of the coupled external device. In this case, the coupled external device may transfer such received user inputs to user equipment 10 through the established signal route.

At step S7120, user equipment 10 may determine whether the received user input from the coupled external device is one of user inputs for disconnecting the coupled external device from user equipment 10, for terminating the activated application, and for controlling the associated application. When the received user input is for termination (Terminated—S7120), user equipment 10 may terminate the activated application at step S7130. When the received user input is for disconnecting the coupled external device from user equipment 10 (Disconnected—S7120), user equipment 10 may release the interface unit coupled to the external device and cancel the established signal route at step S7140. Furthermore, when the received user input is for controlling the activated application, user equipment 10 may perform operations associated with the received user input in association with the activated application at step S7090.

In yet another embodiment, user equipment 10 may obtain an application from an external device when the external device is coupled to user equipment 100 and map the obtained application with a corresponding interface unit coupled to the external device. Such operation will be described in detail with reference to FIG. 8.

FIG. 8 shows a method for controlling a plurality of coupled external devices by obtaining an application from an external device and mapping the obtained application with a corresponding interface unit coupled to the external device in accordance with at least one embodiment of the present invention.

Referring to FIG. 8, user equipment 10 may be coupled to at least one external device at step S8010. At step S8020, user equipment 10 may perform operations associated with at least one coupled external device. In this case, when a new external device is coupled to user equipment 10 at step S8030, user equipment 10 may obtain an application stored in the coupled external devices at step S8050. For example, control unit 100 may recognize connection to an external device when the external device is couple to user equipment 10. Upon the recognition of the connection, control unit 100 may retrieve an application associated with the external device from a memory unit of the external device.

At step S8060, user equipment 10 may execute the obtained application in user equipment 10. At step S8070, user equipment 10 may map the executed application with an interface unit coupled to the external device and establish a signal route between the activated application and the external device. At step S8080, user equipment 10 may perform operations of the executed application. At step S8090, user equipment 10 may transfer operation results to the external device through the established signal route. At step S8100, user equipment 10 may receive user inputs through the established signal route from the coupled external device. For example, the coupled external device may receive various types of user inputs through input units of the coupled external device. In this case, the coupled external device may transfer such received user inputs to user equipment 10 through the established signal route.

At step S8110, user equipment 10 may determine whether the received user input from the coupled external device is one of user inputs for disconnecting the coupled external device from user equipment 10, for terminating the activated application, and for controlling the associated application. When the received user input is for termination (Terminated—S8110), user equipment 10 may terminate the activated application at step S8120. When the received user input is for disconnecting the coupled external device from user equipment 10 (Disconnected—S8110), user equipment 10 may release the interface unit coupled to the external device and cancel the established signal route at step S8130. Furthermore, when the received user input is for controlling the executed application, user equipment 10 may perform operations associated with the received user input in association with the executed application at step S8080.

In still yet another embodiment, user equipment 10 may obtain information on a device type of an external device when the external device is coupled to user equipment 100 and obtain an application matched with the device type. Such operation will be described with reference to FIG. 9.

FIG. 9 shows a method for controlling a plurality of coupled external devices by selecting an application based on a device type of a coupled external device and mapping the selected application with to the coupled external device in accordance with at least one embodiment of the present invention.

Referring to FIG. 9, user equipment 10 may be coupled to at least one external device at step S9010. At step S9020, user equipment 10 may perform operations associated with at least one coupled external device. In this case, when a new external device is coupled to user equipment 10 at step S9030, user equipment 10 may obtain information on a type of the connected external device at step S9050. Based on the obtained device type of the coupled external device, user equipment 10 may select one of applications, matched with the type of the connected external device at step S9060. For example, control unit 100 may determine a device type of an external device based on device information thereof when the external device is coupled to user equipment 10. Based on the determined device type, control unit 100 may select an application matched with the determined device type. In this case, control unit 100 may select at least one application installed in user equipment 10 and provide a list of the selected applications to a user for selection.

At step S9070, user equipment 10 may execute the selected application in user equipment 10. At step S9080, user equipment 10 may map the executed application with an interface unit coupled to the external device and establish a signal route between the activated application and the external device. At step S9090, user equipment 10 may perform operations of the executed application. At step S9100, user equipment 10 may transfer operation results to the external device through the established signal route. At step S9110, user equipment 10 may receive user inputs through the established signal route from the coupled external device. For example, the coupled external device may receive various types of user inputs through input units of the coupled external device. In this case, the coupled external device may transfer such received user inputs to user equipment 10 through the established signal route.

At step S9120, user equipment 10 may determine whether the received user input from the coupled external device is one of user inputs for disconnecting the coupled external device from user equipment 10, for terminating the activated application, and for controlling the associated application. When the received user input is for termination (Terminated—S9120), user equipment 10 may terminate the activated application at step S9130. When the received user input is for disconnecting the coupled external device from user equipment 10 (Disconnected—S9120), user equipment 10 may release the interface unit coupled to the external device and cancel the established signal route at step S9140. Furthermore, when the received user input is for controlling the executed application, user equipment 10 may perform operations associated with the received user input in association with the executed application at step S9090.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a controlling unit, a controlling unit, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose controlling unit, the program code segments combine with the controlling unit to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a plurality of external devices coupled to user equipment, the method comprising:
   determining whether one of applications installed in user equipment is activated upon receipt of a user input when the user equipment is coupled to a plurality of external devices;
   selecting one of the coupled external devices as a target external device to be mapped, when the application is determined as being activated; and
   mapping the selected coupled external device with the activated application and establishing a signal route between the user equipment and the selected coupled external device in association with the activated application,
   wherein the selecting includes selecting, as candidate external devices, at least one of the coupled external devices based on information on execution environment of the activated application and information on the coupled external devices and selecting, as a target external device, one of the candidate external devices in response to a user input,
   wherein the execution environment information is information on requirements for executing the activated application and includes information on a required input unit type, a required output unit type, a required displaying setting including a required resolution and a required display size, a required data transmit rate, a required interface type, and a required communication protocol, and the external device information includes information on at least one of an identification number, a device type, an equipped input unit type, an equipped output unit type, an equipped interface unit, a maximum supported resolution, a recommended resolution, a supported horizontal frequency range, a supported vertical frequency range, a supported data transmit rate range, and supported communication protocols, and wherein the selecting includes comparing the execution environment information and the device information and selecting one having properties required by the activated application from the coupled external device based on the comparison result as the candidate external devices.

2. The method of claim 1, including:
providing a graphic user interface for selecting one of the candidate external devices to a user; and
receiving a selection user input for selecting, as the target external device, one of the candidate external devices through the provided graphic user interface.

3. The method of claim 1, wherein the mapping:
mapping an interface unit coupled to the selected target external device to the activated application.

4. The method of claim 1, further comprising:
performing operations associated with the activated application;
transferring operation results to the selected target external device through the established signal route; and
receiving a user control input from the selected target external device through the established signal route and performing operations based on the received user control input.

5. The method of claim 1, wherein the selecting includes:
obtaining information on execution environment of the activated application; and
selecting, as the target external device to be mapped, one of the coupled external devices based on the obtained execution environment information of the activated application.

6. The method of claim 5, wherein:
the execution environment information is information on requirements for executing the activated application and includes information on a required input unit type, a required output unit type, a required displaying setting including a required resolution and a required display size, a required data transmit rate, a required interface type, and a required communication protocol;
the external device information includes information on at least one of an identification number, a device type, an equipped input unit type, an equipped output unit type, an equipped interface unit, a maximum supported resolution, a recommended resolution, a supported horizontal frequency range, a supported vertical frequency range, a supported data transmit rate range, and supported communication protocols; and
comparing the execution environment information and the device information and selecting, as the target external device, one having most properties required by the activated application from the coupled external device based on the comparison result as the candidate external devices.

7. The method of claim 1, wherein the selecting includes:
selecting the target external device based on priorities of the coupled external devices.

8. The method of claim 7, wherein the priorities are previously assigned to external devices connectable to the user equipment and information on the priorities is stored in a memory of the user equipment.

9. The method of claim 1, further comprising:
obtaining device information of external devices when the external devices are coupled to user equipment; and
assigning the priorities to the coupled external devices based on the obtained device information and information on execution environment of the activated application.

10. The method of claim 9, wherein the assigning includes:
giving a certain weight value to properties of an external device;
adding certain weight value of properties required for executing the activated application; and
assigning the priorities based on total values of the coupled external devices.

11. The method of claim 9, including:
updating the priorities of the coupled external devices when another external device is coupled to the user equipment.

12. A method for controlling a plurality of external devices coupled to user equipment, the method comprising:
obtaining device information of an external device when the external device is coupled to the user equipment;
selecting one of applications installed in the user equipment based on a device type included in the obtained device information;
executing the selected application;
mapping the coupled external device with the executed application and establishing a signal route between the user equipment and the coupled external device in association with the executed application;
obtaining device information of external devices when the external devices are coupled to user equipment; and
assigning the priorities to the coupled external devices based on the obtained device information and information on execution environment of the activated application,
wherein the assigning includes giving a certain weight value to properties of an external device, adding certain weight value of properties required for executing the activated application, and assigning the priorities based on total values of the coupled external devices.

13. A user equipment for controlling a plurality of external devices coupled thereto, the user equipment comprising:
a plurality of interface units each configured to connect an external device and the user equipment and to provide a signal path for exchanging data between the user equipment and the connected external device;
an application driving unit configured to load at least one activated application and to drive the at least one activated application; and
a control unit configured to determine whether one of applications installed in user equipment is activated upon receipt of a user input when the user equipment is coupled to a plurality of external devices through the plurality of interface units, to select one of the coupled external devices as a target external device to be mapped, when the application is determined as being activated, to map an interface unit coupled to the selected coupled external device with the activated application and to establish a signal route between the user equipment and the selected coupled external device in association with the activated application, wherein the control unit is configured to obtain device information of external devices when the external devices are coupled to user equipment and assign the priorities to the coupled external devices based on the obtained device information and information on execution environment of the activated application, and wherein the control unit is configured to give a certain weight value to properties of an external device, add certain weight value of properties required for executing the activated application, and assign the priorities based on total values of the coupled external devices.

14. The user equipment of claim 13, wherein the control unit is configured to:
  select, as candidate external devices, at least one of the coupled external devices based on information on execution environment of the activated application and information on the coupled external devices; and
  select, as a target external device, one of the candidate external devices in response to a user input.

15. The user equipment of claim 13, wherein the control unit is configured to:
  obtain information on execution environment of the activated application; and
  select, as the target external device to be mapped, one of the coupled external devices based on the obtained execution environment information of the activated application.

* * * * *